United States Patent Office 2,914,506
Patented Nov. 24, 1959

2,914,506

HALOGEN-CONTAINING RESINS STABILIZED WITH ORGANO-TIN MERCAPTO COMPOUNDS

Gerry P. Mack, Jackson Heights, and Emery Parker, New York, N.Y., assignors, by mesne assignments, to Carlisle Chemical Works, Inc., Reading, Ohio, a corporation of Ohio No Drawing. Application January 2, 1953
Serial No. 329,481

3 Claims. (Cl. 260—45.75)

The invention relates to stabilized halogen-containing resins and compositions containing the same.

It is well known that halogen-containing resins, particularly vinyl chloride resins and resins formed by conjoint polymerization of vinyl chloride with vinyl acetate or other unsaturated compounds polymerizable therewith, are liable to discoloration when subjected to elevated temperatures during or after compounding and also under the influence of prolonged exposure to light.

Among the stabilizers proposed to prevent said discoloration, tin in the form of various organo-tin compounds has proved effective. In these compounds, the $R_2Sn$- or $R_3Sn$- group is linked to organic groups which influence the physical and chemical properties of the stabilizer and have generally the function to render the compound compatible with the resins to be stabilized, but which, as a rule, do not contribute of themselves to the stabilizing effect proper.

We have found a new group of organo-tin compounds, in which the stabilizing properties inherent in the organo-tin radical are considerably enhanced by the specific organic group attached to the tin atom.

This new class of stabilizers consists of organo-tin compounds in which at least one organic radical containing a mercapto group is linked through the sulfur atom of the mercapto group SH directly to the tin atom of the organo-tin radical.

Such organo-tin mercapto compounds have a stabilizing action on halogen-containing resins which is superior to the organo-tin compounds used heretofore for this purpose. They are effective up to relatively very high temperatures and can be employed for conventional resin mixes as well as for plastisols and organosols.

Various reaction mechanisms are possible for explaining the excellent stabilizing performance of the organo-tin mercapto compounds. We do not wish to limit the scope of our invention in any way by theoretical speculations; however, we believe that the highly reactive mercapto group of the organo-tin compounds may react in various ways to prevent the degradation of halogen-containing polymers, particularly vinyl chloride polymers, and that one mode of reaction is probably similar to the vulcanizing action of certain mercapto compounds on the double bonds of polymers.

The simplest representatives of the novel stabilizers are organo-tin mercaptides of the formula (1) 

where R and R' are monovalent hydrocarbon radicals and n is an integer from 2 to 3. Such organo-tin mercaptides have been disclosed and claimed in our copending application, Serial No. 177,968, filed August 5, 1950, now Patent No. 2,727,917, of which this application is a continuation-in-part.

As stated hereinabove, the critical components of the novel stabilizers are the organo-tin group and the mercapto group. The stabilizing action is, therefore, not limited to compounds of Formula 1 but is shown by all compounds in which a mercapto radical is bound through the sulfur atom of the mercapto group to the tin atom of the organo-tin radical. These compounds may be broadly defined by the formula (2) 

wherein R, R', SX and Z have the following significance: R and R' may be different monovalent hydrocarbon radicals but will be generally the same radicals because the starting materials for the preparation of the organo-tin mercapto compounds will be generally the di-(or tri-) hydrocarbon tin halides or oxides available in commerce. The nature of these groups has in most cases no, or only a very minor, influence on the properties of the end products. R and R' may be aliphatic, aromatic, or alicyclic groups, such as methyl, ethyl, propyl, butyl, amyl, hexyl, octyl, lauryl, allyl, benzyl, phenyl, tolyl, cyclohexyl.

SX may be, for instance, the rest of a mercaptan, of a mercapto alcohol, or of an ester of a mercapto alcohol or mercapto acid.

Aliphatic and aromatic mercaptans may be employed to form said group SX. In the case of aliphatic mercaptans, we prefer mercaptans having 8 to 18 C atoms, e.g. decyl or dodecyl mercaptan, because the lower mercaptans are unsuitable for the preparation and use of the stabilizers on account of their offensive smell.

Suitable aromatic mercaptans are, for instance, thionaphthol, thiobenzyl alcohol, phenoxyethyl mercaptan, phenoxyethoxyethyl mercaptan, and others.

As examples for suitable mercapto alcohols, we may recite mono thioethylene glycol, mono thiopropylene glycol, thioglycerol, thio diethylene glycol, and others. Particularly suitable are the esters of these mercapto alcohols in which the hydroxyl groups are esterified by an aliphatic, aromatic, or alicyclic saturated or unsaturated mono carboxylic acid. An example of such an ester is e.g. thioglycol 2-ethyl hexoic acid ester disclosed in our copending application, Serial No. 177,968, now Patent No. 2,684,973.

Readily available mercapto acid esters are the esters of thioglycolic acid, such as ethyl thioglycolate, and generally the esters of mono and dibasic aliphatic and aromatic mercapto acids, such as esters of beta thiopropionic acid, thiolactic acid, thiobutyric acid, alpha mercapto lauric acid, thiomalic acid, thiosalicylic acid, and the like.

The group Z may be a monovalent hydrocarbon radical like R and R', in which case the compound is a tri-hydrocarbon tin mercapto compound. The three hydrocarbon groups may have the same or different composition. Z may also be the rest of a mercapto compound linked through the S atom to the tin atom, in which case it may have the same composition as SX or a different composition. In the former case, we have a dihydrocarbon tin dimercapto compound; in the latter case a mixed mercapto derivative of dihydrocarbon stannanediol. In another sub-group Z may be the rest of an alcohol or of a carboxylic acid linked through the oxygen of the alcoholic hydroxyl group or of the carboxylic acid group to the tin atom. Such compounds can be defined as monoesters or monoethers of hydrocarbon substituted stannanediol, in which the second hydroxyl group of the stannanediol is replaced by a mercapto compound. An illustrative list of alcohols and acids which are capable of forming such ether and ester groups has been recited in the copending application, Serial No. 313,806, for Stannanediol Derivatives, filed Oct. 8, 1952, by Gerry P. Mack and Ferdinand B. Savarese.

Finally Z may be an organic radical having a C atom of a methylene group adjacent to at least two negative groups and linked through said C atom to Sn. Such radicals of suitable organic compounds having a methylene group activated by at least two negative groups attached to the carbon atom of the methylene group are disclosed in our Patent No. 2,604,483.

Z may also be the radical of a sulfonamide, imide or oxime.

The various compounds can be prepared from the organo-tin halides, oxides (or hydroxides) and alkoxides. In the simplest case, the preparation can be illustrated by the following equations:

(3) $R_3SnOH + HSX \rightarrow R_3SnSX + H_2O$
(4) $R_3SnCl + NaSX \rightarrow R_3SnSX + NaCl$
(5) $R_3SnOR' + HSX \rightarrow R_3SnSX + R'OH$
(6) $R_2SnO + 2HSX \rightarrow R_2Sn(SX)_2 + H_2O$
(7) $R_2SnCl_2 + 2NaSX \rightarrow R_2Sn(SX)_2 + 2NaCl$
(8) $R_2Sn(OR')_2 + 2HSX \rightarrow R_2Sn(SX)_2 + 2R'OH$ In the above equations, it has been assumed for the sake of convenience that the hydrocarbon radicals R have the same composition. This is not necessary and the symbols $R_2$ and $R_3$ should be understood to stand also for $R'R^2$ and $R'R^2R^3$ respectively.

The Reactions 5 and 8 are preferably carried out with organo tin methoxide or some other alkoxide of a lower alcohol, and are disclosed in detail in our copending application, Serial No. 177,968, filed August 5, 1950.

If Reaction 8 is carried out with only one mol of the mercapto compound, according to equation (8a) $R_2Sn(OR')_2 + HSX_2 \rightarrow R_2Sn(OR')(SX) + R'OH$ a hydrocarbon-substituted stannanediol derivative is obtained, in which one hydroxyl group of the stannanediol is replaced by an alkoxy group and the other by a mercapto radical.

If, in Equations 6 and 7, one mol each of different mercapto compounds is used, mixed organo-tin mercaptides are obtained.

Instead of using in Reactions 6 and 7 2 moles of a mercapto compound, the same reactions may be carried out with one mol of a mercapto compound having two reactive hydrogen atoms, of which the one is the hydrogen of the sulfhydryl group and the other may be, for instance, the hydrogen of a free carboxylic acid group or any other reactive group. In such case, the two OR' or Cl groups of the organo-tin dialkoxide or dichloride react with the two reactive hydrogen atoms of the mercapto compound, and both free valences of the tin atom are taken up by the radical of the mercapto compound, so as to form compounds, for instance, of the character (9) 

wherein R' is the nucleus of a mercapto acid.

The Reactions 6, 7, and 8 may be also carried out with only one mole of a mercapto compound and with a mole of another organic compound reacting with the organo-tin compound. In this case, compounds of the Formula 2 are obtained. These compounds, particularly those in which Z is an organic acid radical, are of particular value as stabilizers because they do not produce the so-called "cross-staining" when resins stabilized therewith are brought in contact with resins or rubbers containing metal compounds, like lead or cadmium, forming colored sulfides.

Another group of stabilizers is defined by the formulae:

(10) 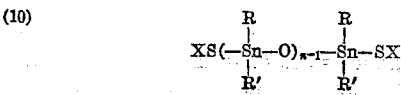

and

(11) $Z-(\underset{\underset{R'}{|}}{\overset{\overset{R}{|}}{Sn}}-O)_{n-1}-\underset{\underset{R'}{|}}{\overset{\overset{R}{|}}{Sn}}-SX$ wherein R, R', SX and Z have the same significance as in Formula 2, and $n$ is a numeral representing the degree of polymerization. It can be from 1.1 to about 12.

These polymeric compounds have the advantage of combining good compatibility with low vapor pressure. The polymeric compounds of Formula 10 may be prepared by reacting, for instance, a polymeric organo-tin dialkoxide as prepared by the process of our application, Ser. No. 29,935, filed May 28, 1948, now Patent No. 2,626,953, with two moles of the mercapto compound.

Compounds of the Formula 11 may be similarly prepared by reacting a polymeric organo-tin alkoxide or a linear hydrocarbon substituted polystannanediol monoester or ether ester with one mole of a mercapto compound. The obtained compounds correspond to Formula 11, wherein Z is an alkoxy group or an organic acid radical, respectively. Another method consists in reacting a polymeric organo-tin alkoxide with one mole of a mercapto compound and one mole of a sulfonamide, imide, oxime, sulfone or a compound having an activated methylene group as recited in Patent No. 2,604,483.

We use the novel organo-tin mercapto compounds in amounts of 0.1 to 10 percent, preferably 0.5 to 5 percent by weight of the organo-tin compound on the weight of the halogen-containing resin. They may be used alone or in mixture with other metallic or non-metallic stabilizers, such as salts of barium, strontium, calcium, zinc, tin, and of other metals which do not form colored sulfides.

Among the non-metallic stabilizers, particularly compounds having one or more epoxy groups in the molecule are of great value. But also compounds having generally recognized anti-oxidant properties such as substituted phenols, tri-esters of phosphorous acid, and the like, can be employed. The new stabilizers are compatible with most of the conventional plasticizers and are of particular utility in combination with plasticizers which may reduce the stability of halogen-containing resins.

As the new compounds may contain three types of groups linked to the Sn atom which can be varied, i.e. the hydrocarbon groups, the radical of a mercapto compound, and the radical defined above by the letter Z, a very large number of different compounds can be prepared and used as stabilizers. In the following examples, we have attempted to give for each type of compounds at least one representative example, and it should be understood that the specific stabilizer disclosed in one example may be replaced by other stabilizers of the same type as well as other types of stabilizers and by the stabilizers used in the other examples, and that the use of such stabilizers is not limited to the specific resin disclosed but that they may be used for any type of halogen-containing resin.

Halogen-containing resins, which are made heat and light resistant by the stabilizers of this invention, include polymers of vinyl chloride and vinyl resins containing vinyl chloride units in their structure, such as copolymers of vinyl chloride with vinyl esters of aliphatic acids, particularly vinyl acetate; copolymers of vinyl chloride with esters of acrylic and methacrylic acids, and with acrylonitrile; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; copolymers of vinyl chloride and vinylidene chloride with unsaturated aldehydes, ketones and others, such as acroein, croton aldehyde, vinyl methyl ketone, vinyl methyl ether, vinyl isobutyl ether, and the like; polymers of vinylidene chloride and copolymers of the same with vinyl chloride and other polymerizable compounds; polymers of vinyl chloroacetate and dichlordivinyl ether; chlorinated polymers of vinyl acetate; chlorinated polymeric esters of acrylic and alpha-substituted acrylic acids; polymers of chlorinated styrenes, for instance dichlorostyrene; chlorinated rubber; chlorinated polymers of ethylene; polymers and afterchlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and fluorides are equally well stabilized.

The following examples will serve to illustrate the invention. It is to be understood that these examples are not to be considered as limiting the scope of the invention, which is defined by the claims, and that a stabilizer given in one example for a particular resin may be used for the resins of the other examples, and vice versa.

Example 1

40.5 g. (0.2 mol.) of lauryl mercaptan and 29.5 g. (0.1 mol.) of dibutyl tin dimethoxide were heated at 130–140° C. under nitrogen gas until the theoretical amount of methanol was recovered and further heating under vacuum did not yield any volatile matter.

A clear colorless liquid dibutyl tin di(dodecyl mercaptide) was obtained in theoretical yield. It had at 20° C. a specific gravity of 1.045 and a refractive index of 1.5177.

Tin content—found 18.5%, theory 18.67%.
Sulfur content—found 9.9%, theory 10.07%.

2 grams of this dibutyl tin di(dodecyl mercaptide) were dissolved in 100 g. of dioctyl phthalate and 100 grams of a vinyl chloride resin of the dispersion type were added. The mix was put through a 3-roll mill to thoroughly disperse the resin, and the plastisol was then de-aerated under vacuum. From this plastisol, films of uniform thickness were cast in aluminum dishes and fused at 365° F. for 5, 15, 30, and 45 minutes together with identical plastisols but one containing no organic tin stabilizer, the other containing an amount of dibutyl tin dilaurate corresponding to the same tin metal content based on the resin. The baked films containing the dimercaptide were colorless after 45 minutes, the films containing the dilaurate were light brown after 15 minutes whereas the films containing no stabilizer had a dark yellow cast after only 5 minutes exposure at 365° F. From the same plastisols thin films of 0.010" thickness were cast, fused at 365° F. for 5 minutes, then exposed in the Atlas Fadeometer to ultra violet light until a breakdown was noticed. All films containing the dimercaptide stabilizer exhibited good stability and were not discolored after exposure of more than 100 hours.

Example 2

1.8 g. tributyl tin mono lauryl mercaptide was added to 100 g. of a vinyl chloride acrylonitrile copolymer resin and the resin stabilizer mix was milled at 400° F. on a rubber mill until uniformly fluxed, which requires about 10 minutes milling. From the so fluxed resin mix, sheets of 0.040" thickness were pressed out between polished chrome plated steel plates at 400° F. and 10,000 p.s.i. pressure for 15 minutes. The pressed rigid sheets were glass-clear and completely colorless. Similar rigid sheets, prepared by using tributyl tin acetate, were discolored slightly already after the milling operation and discolored badly upon heat pressing.

Example 3

29.5 g. of dibutyl tin dimethoxide and 20.2 g. of lauryl mercaptan were mixed and heated under reduced pressure until the volatile methanol liberated in the reaction was completely removed. The compound obtained corresponded to the formula

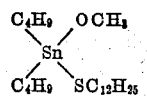

and contained 25.5% of tin and 6.8% of sulfur. 1.2 grams of this compound were dissolved in 50 grams of a mixture of equal parts of di 2-ethylhexyl phthalate and dioctyl phenyl phosphate and the solution added to 100 parts of a vinyl chloride-vinyl acetate copolymer resin containing 95% of vinyl chloride and 5% of vinyl acetate. The mixture was milled on a rubber mill at 325° F. until a uniformly fluxed sheet was obtained. This sheet was then heat press polished at 325° F. and under 10,000 p.s.i. pressure to a film of 40 mil thickness between polished chrome-plated steel plates. 1 by 2 inch strips of the so obtained glass-clear lustrous stabilized film were exposed to heat in an air circulating oven at 325° F. for various lengths of time until a definite breakdown of the film was noticeable as demonstrated by the development of an increasingly darker color and by an increased brittleness of the exposed film. The films stabilized with the dibutyl tin methoxide dodecylmercaptide were practically colorless after 75 minutes heat exposure whereas an unstabilized film was brown already after 10 minutes heat exposure.

Example 4

A mixture of 0.1 mol of lauryl mercaptan, 0.1 mol of lauric acid and 0.1 mol of dibutyl tin oxide were heated under vacuum until the water formed in the reaction was completely eliminated. The obtained product corresponded essentially to the formula

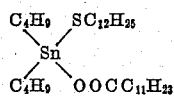

and contained 18.8% of tin and 5.0% of sulfur; it had a specific gravity of 1.036, and a refr. index of 1.4834 at 20° C.

1.67 g. of this dibutyl tin laurate lauryl mercaptide were dissolved in 48.4 g. of 2-ethylhexyl phthalate and then mixed with 100 g. of a vinyl chloride resin. The mixture was then milled on a rubber mill continuously for 1 hour at 345° F. Every 5 minutes a sample was removed and compared to an identical resin mix which did not contain any stabilizer. The stabilized film was practically colorless after 1 hour and did not stick to the rolls of the mill, whereas the unstabilized film was reddish brown after 15 minutes and had to be removed from the mill after 20 minutes because of excessive sticking.

Example 5

73.8 g. of mono oleyl maleate as prepared by heating equimolar amounts of maleic anhydride and oleyl alcohol, 40.4 g. of lauryl mercaptan and 50 g. of dibutyl tin oxide were heated together under stirring at 100–110° C. until the water of reaction was eliminated; the last traces of water were removed by heating the reaction product under reduced pressure. The reaction product contained 15.0% of tin and 4.0% of sulfur and had a specific gravity at 20° C. of 1.038 and a refractive index at 20° C. of 1.4890. It corresponded essentially to the dibutyl tin lauryl mercaptide oleyl maleate of the formula

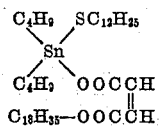

2.3 g. of this stabilizer were dissolved in 50 g. of di 2-ethylhexyl phthalate and the solution blended with 100 g. of vinyl chloride-vinylidene chloride copolymer resin. The mix was then milled on a two roll mill at 325°–335° F. for 10 minutes until a uniformly fluxed transparent sheet was obtained. From this sheet four press polished sheets were pressed out between polished chrome plated steel plates to samples of 6 by 6 inches and a thickness of 0.040 inch. The four sheets were further pressed in the hot press at 325° F. at 10,000 p.s.i. pressure for 30, 45, 60, and 90 minutes. All four films were glass-clear and colorless, whereas identical films containing the same amount of organic tin in form of dibutyl tin maleate were slightly discolored after 30 minutes and turned brown after 45 minutes heat pressing.

*Example 6*

2 grams of dibutyl tin dilauryl mercaptide (see Example 1) were dissolved in 30 g. of di 2-ethylhexyl phthalate and the solution was emulsified using a non-ionic emulsifier, such as polyethylene glycol mono-oleate, by means of a high speed stirrer or colloid mill in 32 grams of water. The emulsion was then added to a modified polyvinyl chloride latex of 50% solid content under slow stirring. The Sn stabilized and plasticized latex was coated on a fabric in a thickness of approximately 0.008" thickness, completely dried and then exposed to heat at 330° F. until discoloration took place, together with identical coated fabrics where the vinyl latex did not contain any stabilizer. The stabilized coating was substantially colorless after 1 hour heat exposure, whereas the unstabilized coating was badly discolored after 10 minutes.

*Example 7*

59 grams of pure distilled dibutyl tin dimethoxide having a boiling point of 152° C. at 2 mm., 26 grams of normal octyl alcohol, and 40.6 grams of normal octyl thio glycolate having a boiling point of 79 and 80° C. at 3.5 mm. were heated under nitrogen until the theoretical amount of methyl alcohol was distilled out. The residue was then heated further under reduced pressure until all volatile ingredients were eliminated. A clear colorless liquid product of the formula

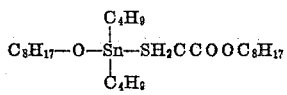

was obtained in almost theoretical yield. It had a molecular weight of 565.4 and a tin content of 21.0%. The specific gravity at 20° C. was 1.0892 and the refr. index at 20° 1.4896.

*Example 8*

5 moles of dibutyl tin oxide and 1 mole of 2-ethyl hexyl thioglycolate were mixed and heated under nitrogen to prevent any oxidation until the dibutyl tin oxide dissolved. The water of reaction was removed under vacuum and the product obtained filtered from a small amount of impurities. The liquid colorless compound obtained had the following formula:

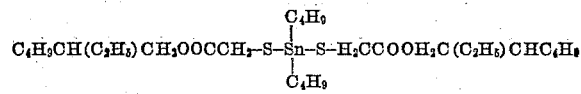

This compound had a molecular weight of 642.4, a tin content of 18.61% (theoretical tin content=18.53%), a refr. index at 20° C.=1.5073, and specific gravity at 20° C.=1.1313. The same compound having exactly the same physical characteristics was obtained if instead of the dibutyl tin oxide the equivalent amount of dibutyl tin dimethoxide was used.

*Example 9*

.05 mole=24 grams of dilauryl tin oxide and .05 mole of thiosalicylic acid were refluxed in toluol until a clear solution was obtained and .05 mole of water separated. The toluol was then removed under reduced pressure and a soft waxy product was obtained in nearly theoretical yield. The reaction product had a molecular weight of 609.4 and a tin content of 18.7% (theoretical tin content 19.46%) and corresponded to the formula:

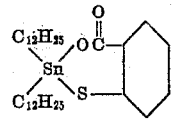

*Example 10*

.2 mole of dimethyl tin oxide and .4 mole of thioglycerol were heated until a clear solution was obtained. The water was then distilled out under reduced pressure and the resulting viscous clear product was dried under vacuum. The compound obtained had a molecular weight of 363.06 and a tin content of 32.65% (theoretical tin content 32.7%), R.I. 20° C.=1.6026, sp. g. 20° C.=1.6596. The liquid product is completely water soluble and has the following formula:

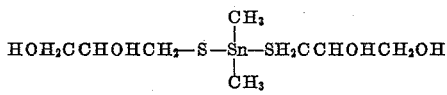

In an identical manner the corresponding dibutyl tin derivative of thioglycerol was prepared which had a R.I. 20° C.=1.5703, sp. g. 20° C.=1.3702, tin content=26.5%. This compound was not water soluble.

*Example 11*

.2 mole of diphenyl tin dimethoxide and .2 mole of beta mercapto propionic acid were refluxed in toluol and the toluol methanol azeotrope continuously replaced with toluol until no more methanol could be detected in the distillate. The product obtained, which was insoluble in toluol, was filtered, washed, and dried. It had a molecular weight of 377.0 and the formula:

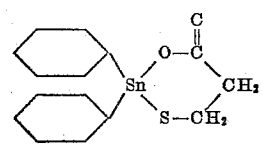

Tin content=30.7% (theoretical content 31.5). Melting point=220° to 225° C. (dec.).

*Example 12*

In an identical procedure as outlined in Example 8, a mixed organo-tin dimercaptide was prepared by reacting equimolar amounts of beta thionaphthol and normal octyl thioglycolate with dibutyl tin oxide or dibutyl tin dimethoxide. In both cases identical products were obtained having a tin content of 19.7%, R.I. 20° C.=1.5796, sp. g. 20° C.=1.2006, and the following formula:

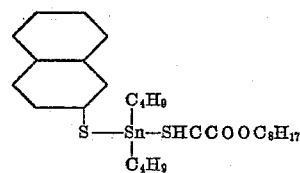

which requires 1994% of tin and has a molecular weight of 595.45.

*Example 13*

Using the procedure as outlined in Example 8 and reacting diphenyl tin oxide and dibutyl mercapto succinate having a boiling point of 170 to 172° C. at 5 mm., the corresponding diphenyl tin dimercaptide was obtained having the formula:

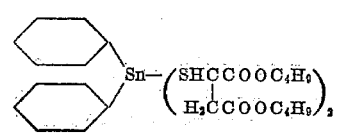

which requires 14.9% of tin has a molecular weight of 795.7. R.I 20° C.=1.5400, sp. g. 20° C.=1.2290.

The compounds prepared according to Examples 7 to 13 were tested as stabilizers by incorporating 1 to 2 g. in 50 g. of a plasticizer and adding the mixture to 100 g. of a vinyl chloride-vinylacetate copolymer in the manner described in Example 3. On heating stabilized films from this mixture in the same way as set forth in said example, the films remained colorless for at least 60 min.

*Example 14*

A polymeric dibutyl tin dimethoxide was prepared according to Example 1 of our copending patent application, Serial No. 29,935, filed May 28, 1948, now Patent No. 2,626,953. This dibutyl tin dimethoxide was a mixture of polymer and monomer having an average degree of polymerization of about 1.25, as determined from the tin and methoxy content. 300 g. of this polymer were mixed with 162 g. of lauryl mercaptan and the mixture was heated at 100–110° C. until 25.6 g. of methanol had distilled out. The batch was then further heated at 110–120° C. for two hours while leading moist nitrogen through the product and condensing the escaping gases which contained methanol and water. After a small amount of impurity was filtered off, a clear, almost colorless compound was obtained having a tin content of 27.8% and corresponding substantially to the formula:

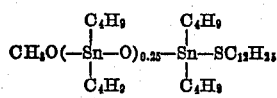

Two grams of this compound were added to 100 g. of vinyl chloride resin and the mixture milled on a 2-roll mill at 340° F. for 10 minutes. Then the plastic mass was sheeted out and press-polished between chrome-plated steel plates for 15, 30, 45, 60 and 90 minutes at 320° F. and 10,000 p.s.i. pressure to sheets of 0.040 inch thickness. All sheets remained colorless and glass clear even after 90 minutes of heat-pressing.

What we claim is:

1. A heat and light resistant plastic composition, including as a major constituent a halogen-containing resin and as a stabilizer an organo-tin mercapto compound of the formula $$\begin{array}{c} R \\ \diagdown \\ R' \end{array} \!\!\! Sn \!\!\! \begin{array}{c} SX \\ \diagup \\ OOR'' \end{array}$$

wherein R and R' are monovalent hydrocarbon radicals, OOR'' is a carboxylic acid radical selected from the group consisting of monocarboxylic acid radicals and polycarboxylic acid radicals having not more than three carboxyl groups of which all but one are blocked by esterification, and where SX is the radical of a mercapto compound selected from the group consisting of aliphatic mercaptans having 8 to 18 C atoms, aromatic mercaptans, monohydric and polyhydric mercaptoalcohols and mercaptoalcohol esters, mercaptoacids and mercaptoacid esters, said radical being linked to the Sn atom through the S atom of the mercapto group.

2. A heat and light resistant composition as defined in claim 1 wherein the resin is a polymer containing a plurality of vinyl chloride units.

3. A heat and light resistant plastic composition as defined in claim 1 wherein the resin is a conjoint polymer of vinyl chloride with another polymerizable compound.

References Cited in the file of this patent

UNITED STATES PATENTS

| | | |
|---|---|---|
| 2,641,588 | Leistner et al. | June 9, 1953 |
| 2,641,596 | Leistner et al. | June 9, 1953 |
| 2,648,650 | Weinberg et al. | Aug. 11, 1953 |

UNITED STATES PATENT OFFICE
CERTIFICATE OF CORRECTION

Patent No. 2,914,506                            November 24, 1959

Gerry P. Mack et al.

It is hereby certified that error appears in the printed specification of the above numbered patent requiring correction and that the said Letters Patent should read as corrected below.

Column 7, line 50, for "5 moles" read -- .5 moles --; column 8, line 62, for "1994%" read -- 19.94% --.

Signed and sealed this 6th day of September 1960.

(SEAL)
Attest:

ERNEST W. SWIDER                            ROBERT C. WATSON

Attesting Officer                              Commissioner of Patents